Patented June 1, 1948

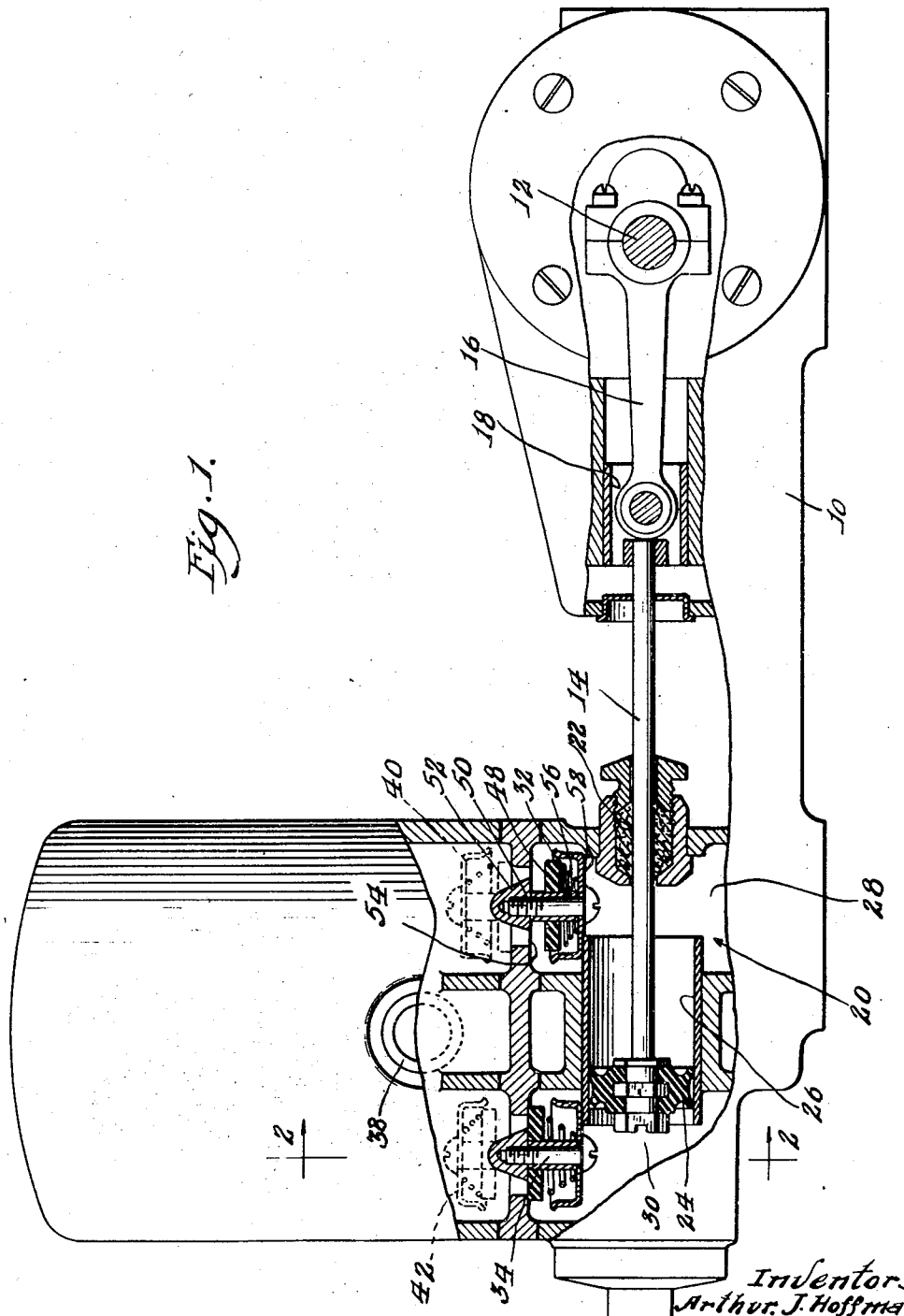

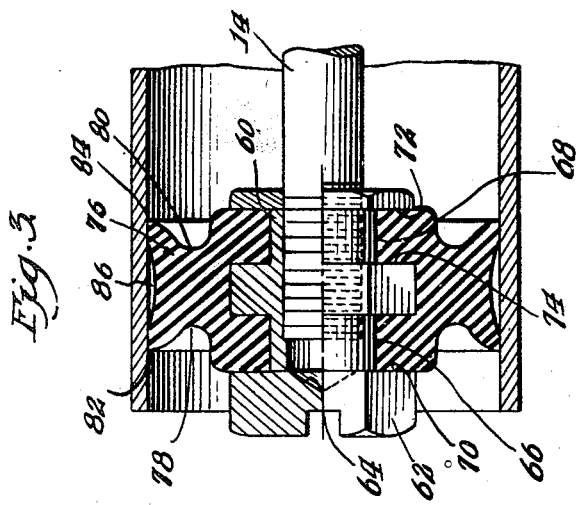

2,442,650

UNITED STATES PATENT OFFICE 2,442,650

PISTON PUMP

Arthur J. Hoffman and Richard W. Muerle, Springfield, Ill., assignors to Montgomery Ward & Co., Incorporated, Chicago, Ill., a corporation of Illinois Application March 2, 1945, Serial No. 580,658

6 Claims. (Cl. 309—4)

This invention relates to reciprocating displacement pumps and more particularly to a piston construction therefor having shock absorbing and quiet operating characteristics.

In water pumps having reciprocating pistons such as are employed in domestic water systems, dependable and quiet operation is of great importance. In such pumps, the rapid reciprocating movement of the piston in displacing the liquid drawn into and discharged from the cylinder, creates movements of water columns therein resulting in a "water hammering" action, the outward manifestations of which are unnecessary noise and throbbing. Such noise and throbbing are usually indicative of the imposition of severe stresses in repeating rapid succession upon the parts such as valves and washers and piston packings and upon the connecting rod, crosshead, and crank shaft bearings, as well as the drive and driving motor. These stresses result in excessive wear, shortening the life or the care free service period of the apparatus and gradual lowering of its efficiency.

It is an object of the present invention to eliminate or lessen the shock or water hammering action resulting from the reciprocation of the piston upon the liquid being displaced, by providing a piston which in itself is yielding and resilient and therefore adapted to absorb the shock at the point of its occurrence or cause.

A further object of the invention is to provide in a pump of the class described a piston constructed for the most part of rubber or synthetic rubber which is adapted to yield and thereby avoid the creation of extreme pressures upon the reversal of movement of the piston or upon the reaction resulting from the sudden closing of certain of the valves of the cylinder displacement chambers.

A still further object is to provide a quiet operating pump having a rubber or synthetic rubber piston economical in construction, and capable of absorbing shocks resulting from water movement in the cylinder which might otherwise be transmitted to the bearings and parts.

The above and other novel features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had for this purpose to the appended claims.

In the drawings wherein similar reference characters refer to similar parts throughout the several views:

Figure 1 is a side elevation of a water pump, parts of which are in longitudinal section to disclose the arrangement of the piston and related parts, the section being taken substantially on line 1—1 of Fig. 2;

Figure 2 is a section taken substantially on the line 2—2 of Fig. 1 disclosing an end view of the piston and the related parts and, Figure 3 is an enlarged view of the piston, portions of which are shown in section as indicated.

Referring to the drawings and particularly Fig. 1, there will be seen a pump of the type employed for a household water system, the pump being adapted to lift water from a well and discharge such water under pressure into a water system under pressure. The pump comprises a frame 10, upon which is mounted a power driven crank 12, actuating a piston rod 14, through the connecting rod 16, and its associated crosshead 18. The piston rod extends into a double ended cylinder 20, through an end stuffing box 22, and is provided on its end with a piston 24, shown in detail in Fig. 3, adapted to reciprocate within the cylinder sleeve 26. The displacement chambers 28 and 30 at the opposite ends of the cylinder 20, are provided with inlet and outlet valves, the inlet valves 32 and 34 communicating with a suction chamber 36 to which an inlet pipe 38 is connected. The outlet valves 40 and 42 are adapted to discharge into a pressure chamber 44 which is in turn connected to a discharge pipe 46.

Each of the valves referred to is similar in construction and comprises a rubber, composition, or synthetic rubber (such as neoprene) valve disc 48 slideable upon a valve post 50 supported from a spider 52 arranged in the valve seat 54. The valve disc is caused to be seated by a conical spring 56 and the rush of fluid in reverse direction through the valve is prevented from directly acting upon the valve disc by a valve silencer cup 58. The valve silencer forms the subject matter of a copending application, Ser. No. 578,706, filed February 19, 1945.

The piston previously described is illustrated in a preferred form in Fig. 3. Therein the piston rod 14 is shown threaded into metallic insert in the form of a thimble or sleeve 60, formed of hexagonal cross-section material as shown at 62. A central threaded bore 64 is provided to receive the threaded end of the piston rod 14. The exterior of the thimble is turned to produce cylindrical surfaces 66 and 68 bounded on either end by the hexagonal outlined shoulders or flanges 70 and 72, and separated by an intermediate hexagonal shoulder 74. Mounted upon the thimble and preferably molded so as to adhere to the thimble is an annulus of rubber-like material generally indicated at 76 which by reason of the shoulders 70, 72, and 74 is mechanically interlocked with the thimble to prevent relative movement either axial or rotational, the shoulder 74 being hexagonal. The annular ring is of such cross-section as may be described within a trapezoid, that is, it includes a base portion in engagement with the thimble and a second base portion of narrower width adapted to engage the cylinder wall and is generally symmetrical.

In order to provide resiliency within the piston so formed by the annular member, annular concave recesses 78 and 80 are formed in the side faces of the rubber-like member and the side faces have a substantial area of exposure beyond the flanges 70 and 72. The annular recesses in the side faces reduce the axial thickness of the ring therebetween and render the ring axially resilient and able to absorb shocks imposed upon the column of liquid which it is in contact with during pumping operation. The annular grooves in the side face also form annular sealing lips 82 and 84 which are subjected to the pressure of the liquid against the side face and provide, in effect, leak-proof cups slideably engaging the cylinder wall under proper pressure conditions. The annular outside face of the rubber-like member is provided with a slight annular concavity 86 between the cups formed by the lips 82 and 84 which reduces friction and assists in the water tight operation of the lips in their bearing against the cylinder wall.

It will be observed that the piston described comprises a stable annulus of rubber-like material because of the relative dimensions thereof, for example, the radial thickness of the ring being commensurate with the axial length of the cylinder engaging face of the ring and that by reason of the contour of the side faces of the ring resulting in a reduced axial length centrally, of the side annular exposed areas, resilience and ability to absorb successive shockss is built into the piston itself. The rigidity of the crank, connecting rod, and piston and their respective bearings does not provide for any yielding effect in such pumps and even if a yielding effect were present in these parts, it would be too remote from the source of the original shock and therefore ineffective to reduce such shocks and the throbbing noise resulting from the rapid reversal of the piston movement and the sudden closing of the various valves during each cycle of operation. By employing a piston construction in the main composed of rubber-like material such as that shown, the hammering effect of moving columns of water within the displacement chambers of the cylinder is considerably reduced and the shock and noise resulting substantially eliminated.

In the operation of such a pump the piston is rapidly moved to and fro in substantially simple harmonic motion by the rotation of the crank at speeds as high or higher than 250 revolutions per minute. Upon the suction stroke, the inlet valve is caused to open and liquid thereupon flows into the space displaced by the movement of the piston. As the piston commences to slow down and reverse its motion the movement of the liquid flowing through the valve must be arrested and upon reversal of the movement of the piston the inlet valve is closed and thereupon the liquid which is being displaced by the piston seeks an outlet, forcing the outlet valve open, but at the same time turbulence and movements of water are suddenly shifted to new paths with the piston absorbing the shocks. Subsequently, toward the end of the stroke, the piston reverses its movement, and water which would tend to return through the open outlet valve would, except for such control as may be exercised by the silencer 58, bear upon and rush toward the top of the valve, resulting in its sudden closure. Upon its sudden closure, the receding piston momentarily absorbs the shocks incident to the changes in flow conditions taking place, and the inlet valve opens. The momentary lag in valve operation, and the shifting of the moving stream from the closing valve to the yielding or opening valve, and the reversal of movement of the piston, result in pressure waves, which are deadened by the resilience and yielding of the piston.

The ability of the rubber-like material to absorb such shocks results from its position as a part of the piston itself which is the primary source of the energy which creates the moving columns of water within the chambers resulting in turbulence.

The piston, being non-rigid, is able to absorb the shocks with little or no apparent damage or fatigue, because the peripheral portion of the piston may yield in response to the inertia and pressure of the water behind it during each reversal of movement to soften the blow or shock which otherwise would be present. The yielding of the piston absorbs the shock resulting from the sudden closing of a valve, and the shift from that valve of the stream or flow to the other valve. The softening of the blow each time the piston reverses saves wear and tear on all moving parts of the pump such as the crosshead, cross-headpin, crankshaft bearings, as well as the transmission, whether by belt or otherwise to the driving source of power, as well as extreme pressures on the valve discs in engaging their respective seats.

It will be understood that wherever the term "rubber-like" is employed in the specification or claims, rubber, rubber compounds, and synthetic rubbers such as neoprene are intended, it being understood that the choice of material depends more upon its ability to resist chemical or mechanical change resulting from the liquid in which the piston may be designed to come in contact with.

Although but a single modification of the invention is illustrated and described, it it to be understood that the invention is not limited thereto, but may be subject to variation. Since many changes may be made without departing from the spirit of the invention, as will be apparent to those skilled in the art, reference will be had to the appended claims for a definition of the limits of the invention.

What is claimed is:

1. A pump piston comprising a metallic insert having a central threaded base for receiving a piston rod, and external end flanges, and an external intermediate shoulder, for receiving, confining and interlocking with the inner portion of an annular ring of yielding, flexible and resilient rubber-like material, said ring having an outer portion having a cylindrical face having a slight annular concavity centrally thereof, said ring extending radially beyond said flanges by a substantial amount to provide exposed end annular faces and an annular groove in each of said faces, opposed to one another to form annular opposed sealing cups with the cylinder wall engaging face and a portion of reduced axial length to increase the relative resilient axial movement between the outer portion of said ring and the inner insert supported portion.

2. A shock-absorbing pump-piston comprising a supporting thimble provided with a thereon centrally located annular ridge and bounded at either end by a radial flange, and an annular soft, yielding, flexible and resilient rubber-like packing member whose cross-section is substantially of hour-glass formation, with the inner portion substantially larger than the outer portion, said inner and larger portion being provided with an annular groove congruent in shape with said annular ridge of said thimble and with said ridge engaging said groove; the outer portion of the packing member being narrower than the inner portion, and adapted to yield to laterally applied pressure and provided with a shallow groove on its outer periphery, whereby the outer portions of said packing member by being free from internal rigid supporting parts capable of interfering with the yieldability and flexibility of said outer portion will be free to flex under axially applied distorting forces.

3. A shock-absorbing pump-piston comprising a supporting thimble and a thereon mounted soft axially as well as radially yieldable, flexible and resilient annular rubber-like packing member having a cross-section of substantially hour-glass formation, whereby the outer portion of said member by being entirely free from internal reinforcement which would tend to minimize the flexibility of said outer portion may flex both radially and axially under the impact of liquid thereon.

4. A piston comprising a supporting thimble adapted for connection with a piston rod, and an exterior cylindrical portion bounded at either end by a radial flange, and an annular radially as well as axially yieldable flexible and resilient rubber-like member mounted on said thimble between said flanges, the cross-section of said member being of substantially hour-glass configuration with one enlarged portion being supported between said flanges, whereby said annular member will be free to flex under axially applied distorting forces.

5. A piston comprising a supporting thimble having an aperture adapted to receive the end of a piston rod, and an exterior cylindrical portion bounded at either end by a radial flange, and an annular radially as well as axially yieldable flexible and resilient rubber-like member mounted upon said thimble between said flanges, the cross section of said member being of substantially hour-glass configuration, the height of which is of the order of the width of either of the enlarged portions, one enlarged portion being supported between said flanges, whereby said annular member will be free to flex under axially applied distorting forces.

6. A piston comprising a supporting thimble having a central recess adapted to receive the end of a piston rod, and an exterior portion adapted to receive an axially as well as radially yieldable flexible and resilient rubber-like annular member, said annular member having a cross-section of substantially hour-glass outline, one enlarged portion of said annular member being secured to said thimble, whereby said annular member will be free to flex under axially applied distorting forces.

ARTHUR J. HOFFMAN.
RICHARD W. MUERLE.

REFERENCES CITED

The following references are of record in the file of this patent:

UNITED STATES PATENTS

| Number | Name | Date |
| --- | --- | --- |
| 1,577,732 | Lamb | Mar. 23, 1926 |
| 1,718,474 | McQuaid | June 25, 1929 |
| 1,768,633 | Ries | July 1, 1930 |
| 1,882,434 | MacClatchie | Oct. 11, 1932 |
| 2,274,927 | Lankford | Mar. 3, 1942 |
| 2,277,501 | Murray | Mar. 24, 1942 |